(No Model.)

J. A. RINGS.
CURTAIN POLE RING.

No. 578,424. Patented Mar. 9, 1897.

WITNESSES:

INVENTOR
Julius A. Rings.

UNITED STATES PATENT OFFICE.

JULIUS A. RINGS, OF NEW YORK, N. Y.

CURTAIN-POLE RING.

SPECIFICATION forming part of Letters Patent No. 578,424, dated March 9, 1897.

Application filed April 7, 1896. Serial No. 586,486. (No model.)

*To all whom it may concern:*

Be it known that I, JULIUS A. RINGS, a citizen of the United States, and a resident of New York, in the county of New York and State of New York, have invented certain new and useful Improvements in Curtain-Pole Rings, of which the following is a specification.

The object of this invention is to provide an improved antifriction curtain-pole ring so constructed that its external appearance is the same as that of the ordinary wooden ring. It is composed of a wooden ring of usual size having on the inner surface at one side a metal tube sunk therein flush with the surface, in which is placed a series of balls held in place by the shell of the metal tube, and these balls project beyond the inner surface of the tube, so that when the ring is placed on a pole the balls will ride thereon and prevent the ring from engaging with the pole and producing frictional contact therewith, all of which will now be set forth in detail.

Figure 1:
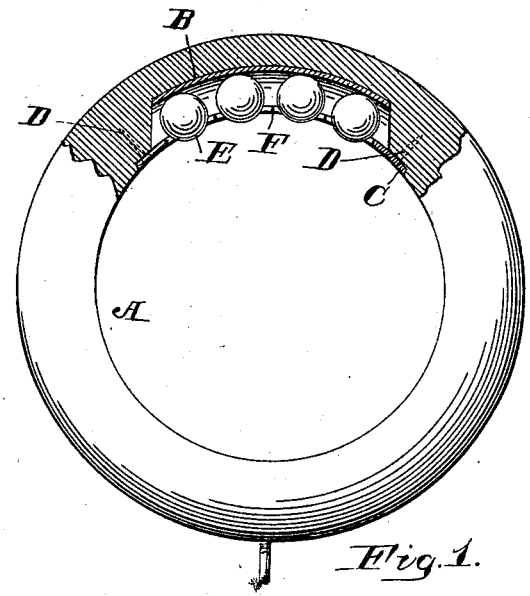
Figure 2:
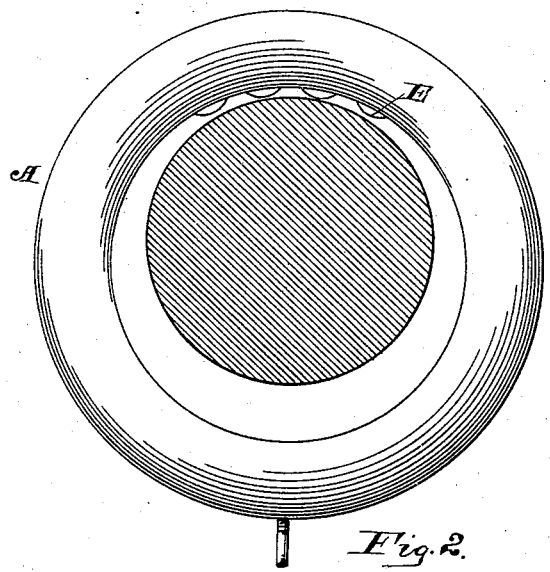

In the accompanying drawings, Figure 1 is a side view, partly in section, of a ring equipped with my improvement. Fig. 2 is a side view of same, showing its position on a pole.

In constructing my improved ring I prefer to have the main body A of wood or of papier-mâché or of any other suitable material. On one side within the ring I form a groove of sufficient size to receive a metal tube B, which when placed in the slot will have its outer exposed surface flush with the inner surface of the ring A.

The tube B is curved to form an arc the same as the ring A and has at each end a wing or extension C, provided with a hole to receive a wooden screw or nail D to hold the tube in position. The exposed surface of the tube has circular openings therein to receive the antifriction-balls E, and these balls are held in position by means of wings or points F, which are pressed out of the metal tube between the openings of the tube.

Various means may be devised to secure this tube in position without departing from the spirit of my invention, as the essential feature is to combine a metal tube for holding the antifriction-balls with a wooden ring.

I am aware that it is not new, broadly, to put together two parts in a curtain-pole ring—that is, to add a means for holding an antifriction ball, wheel, or roller in a ring. My invention has special reference to a tube bent to conform to the curvature of the ring, which tube is designed to hold antifriction-balls. This tube is then secured to the ring on its inner side, so that the ring has itself externally the same appearance as though it were not so equipped. I find that this method of holding in the balls is much more effectual than any other method and is easily applied.

What I claim as new is—

1. The combination of a wooden ring with a metallic tube bent to the same arc as the ring and sunk therein, and antifriction-balls within said tube, and projecting slightly therefrom, substantially as shown.

2. A curtain-pole ring, composed of a turned-up ring, having in combination therewith a tube, provided with openings, and a series of balls within said openings and projecting beyond the surface of the metal tube, substantially as set forth.

3. A curtain-pole ring having on its inner side a short channel, in combination with a tube bent to the curvature of the ring, said tube, having therein one or more antifriction-balls, which project beyond the inner surface of said tube, substantially as set forth.

Signed at New York, in the county of New York and State of New York, this 24th day of March, A. D. 1896.

JULIUS A. RINGS.

Witnesses:
JUL. KROMMES,
TREOD BECKER.